(12) United States Patent
Yeiser, IV (10) Patent No.: US 11,864,478 B2
(45) Date of Patent: Jan. 9, 2024

(54) IMPACT-ASSISTED SHOVEL

(71) Applicant: Yeiser Research & Development LLC, Santee, CA (US)

(72) Inventor: John O. Yeiser, IV, Alpine, CA (US)

(73) Assignee: YEISER RESEARCH & DEVELOPMENT LLC, Santee, CA (US)

( * ) Notice: Subject to any disclaimer, the term of this patent is extended or adjusted under 35 U.S.C. 154(b) by 76 days.

(21) Appl. No.: 17/344,888

(22) Filed: Jun. 10, 2021

(65) Prior Publication Data
US 2021/0386007 A1    Dec. 16, 2021

Related U.S. Application Data

(60) Provisional application No. 63/037,297, filed on Jun. 10, 2020.

(51) Int. Cl.
*A01B 1/02* (2006.01)
(52) U.S. Cl.
CPC .................................. *A01B 1/022* (2013.01)
(58) Field of Classification Search
CPC .............. A01B 1/02; A01B 1/022; B25D 1/16
USPC ............................................... 294/49, 57, 59
See application file for complete search history.

(56) References Cited

U.S. PATENT DOCUMENTS

| | | | | |
|---|---|---|---|---|
| 2,047,485 A | * | 7/1936 | McBrady | A01B 1/022 403/108 |
| 4,241,795 A | * | 12/1980 | Landry, Jr. | B25D 1/16 173/132 |
| 5,768,785 A | * | 6/1998 | Pessin | E04D 15/003 173/90 |
| 5,865,490 A | * | 2/1999 | Vowell | A01B 1/02 294/51 |
| 5,887,920 A | * | 3/1999 | Perciful | A01B 1/02 294/60 |
| 6,109,365 A | * | 8/2000 | Lamoureux | A01B 1/02 173/90 |

FOREIGN PATENT DOCUMENTS

| | | | | |
|---|---|---|---|---|
| CA | 2087210 | * | 7/1994 | |
| GB | 2069914 A | * | 9/1981 | A01B 1/02 |

* cited by examiner

*Primary Examiner* — Dean J Kramer
(74) *Attorney, Agent, or Firm* — Eleanor Musick; Torrey Pines Law Group PC (57) ABSTRACT

A shovel includes a shovel blade, a handle assembly with a tubular section and hammer section, where the hammer section is configured to axially slide within the tubular section to function as an impact hammer. A locking assembly locks the hammer section in one of an extended position and a compressed position relative to the tubular section. Releasing the locking assembly allows the hammer section to axially slide within the tubular section.

17 Claims, 7 Drawing Sheets

IMPACT-ASSISTED SHOVEL

RELATED APPLICATIONS

This application claims the benefit of the priority of Provisional Application No. 63/037,297, filed Jun. 10, 2020, which is incorporated herein by reference in its entirety.

FIELD OF THE INVENTION

The present invention relates to an impact-assisted shovel. In particular, the present invention utilizes a built-in slide hammer to facilitate the breaking or penetration of soil, sand, clay, roots, branches, rocks, bricks, concrete, and ice or hard snow.

BACKGROUND

Many forms of the shovel have existed, throughout history, for mainly digging and moving soil. Commercial shovels serve this main purpose and have evolved to perform other functions. These enhancements were to aid in common problems such as, and not limited to, hardened soil, rocky soil, roots, dense plant growth, Winter snow and ice, and other obstacles. These enhanced, commercial shovels also require a certain amount of strength and persistence, from the user, to surmount these problems. If the user does not provide enough power the work can be delayed or abandoned. Furthermore, in the commercial construction and landscaping field it is common for workers to wear special work boots or orthopedic shoes to provide arch support, stability, and prevent fatigue and injury when using a shovel. Typical shovel users likely do not use special boots or shoes and they can experience foot pain, and easily become tired when shoveling. Some older home gardeners can have mobility issues and using a shovel can require too much balancing effort thus making the work much more difficult.

Therefore, there is a need for a powerful shovel, with the aspects of a high strength shovel, with the ability to easily penetrate hardened soil without having to exert a lot of strength, not waste valuable work time, make the work easier, provide balanced stability, and prevent injury and fatigue.

SUMMARY

The primary objective of the present invention is to provide a shovel with a built-in slide hammer that enables a user to easily dig through hardened soil and rocky soil.

A secondary objective of the present invention is to provide a shovel with a built-in slide hammer that enables a user to easily cut roots, dense plant growth, and dense turf.

A third objective of the present invention is to provide a shovel with a built-in slide hammer that enables a user to break certain rocks, bricks, and concrete.

A fourth objective of the present invention is to provide a shovel with a built-in slide hammer that enables a user to breakup, and move, ice and hard snow.

A fifth objective of the present invention is to facilitate the digging process, with the help of gravity, and thus preventing fatigue and foot injury.

The present invention fulfills these objectives, and performs other functions, with a built-in slide hammer that makes up the upper body of the shovel and is connected to a grip handle. The lower portion of the shovel includes the impact blade which is parallel and connected to the receiving tube of the slide hammer, and is the main external body. On the upper end of the receiving tube is the locking mechanism that locks or releases the slide hammer.

For a consumer to use the present invention, to dig through hardened soil, they may use it as a conventional shovel, and with a lot of force the blade can penetrate the soil. By locking the mechanism, they may also use their body weight on the foothold above the blade to try and penetrate the soil and moving material. Although, this may require more than average strength.

In one aspect of the invention, a shovel includes a shovel blade, a handle assembly having a lower handle section configured to slidably and concentrically receive an upper handle section, the lower handle section comprising a hollow tube having an impact portion at a distal end, wherein the distal end is attached an upper end of the shovel blade, and wherein, when the upper handle section moves axially within the lower handle section, it functions as an impact hammer; a hand grip disposed at a proximal end of the upper handle section; and a locking assembly for locking the upper handle section in one of an extended position and a compressed position relative to the lower tube, wherein releasing the locking assembly allows the upper handle section to slide within the lower handle section. The shovel may further include a hammer head disposed on a distal end of the upper handle section, the hammer head configured to impact upon the impact portion when the upper handle section is driven toward the lower handle section. A bearing member may be disposed between an outer surface of the upper handle portion and an inner surface of the lower handle portion. The locking assembly may include a spring-biased collar disposed at a proximal end of the lower handle section, wherein the spring-biased collar prevents relative axial movement between the upper and lower handle sections by pressing a plurality of ball bearings into an annular channel disposed around the upper handle section.

In another aspect of the invention, a shovel includes a shovel blade, a handle assembly comprising a tubular section and hammer section, wherein the hammer section is configured to axially slide within the tubular section to function as an impact hammer; and a locking assembly for locking the hammer section in one of an extended position and a compressed position relative to the tubular section, wherein releasing the locking assembly allows the hammer section to slide within the tubular section. The shovel may further include a hand grip disposed at a proximal end of the hammer section. A hammer head may be disposed on a distal end of the hammer section where the hammer head is configured to impact upon an impact portion within a distal end of the tubular section. A bearing member may be disposed between an outer surface of the hammer section and an inner surface of the tubular section. The locking assembly comprises a spring-biased collar disposed at a proximal end of the tubular section, wherein the spring-biased collar prevents relative axial movement between the hammer section and the tubular section pressing a plurality of ball bearings into an annular channel disposed around a portion of the hammer section.

The present invention is unique as it allows the user to disengage the locking mechanism to release the built-in slide hammer. With the slide hammer freely able to slide up and down, the user can target the hard soil with the point of the blade, and slide the hammer up then slam the hammer down through the receiving tube. The receiving tube contains a solid metal slug on the lower end that receives the hammer's impact and transfers it down a straight path through the blade and thus penetrates the hardened soil. Compared to a typical shovel, this slide hammer, with less effort and energy, can multiply a user's power in the digging process, and at the same time help avoid fatigue, discomfort, and impact to the body. A consumer can use this same hammering process on clay, roots, rocks, bricks, and concrete. Furthermore, this is effective on ice, although, the slide hammer's impact is directly on the ice or hard snow, and not the receiving end.

A unique and key element of this hammering process is the timing of the impact of the hammer in relation to the locking mechanism. In some embodiments, when the locking mechanism is disengaged it allows the slide hammer to freely move, and even with shock or vibration from the impact, the locking mechanism will keep its position.

DETAILED DESCRIPTION OF THE EMBODIMENTS

The present invention is directed to a shovel with slide hammer with descriptions and references made to the accompanying drawings, and in which shows through the illustrations specific embodiments the invention is used. The embodiments described herein are exemplary and are not intended to be limited only to the specific combinations in which they are shown or described. Rather, as will be readily apparent to those of skill in the art, features described with reference to certain embodiments may be combined with feature of other embodiments without departing from the spirit and scope of the present invention.

Figure 8:
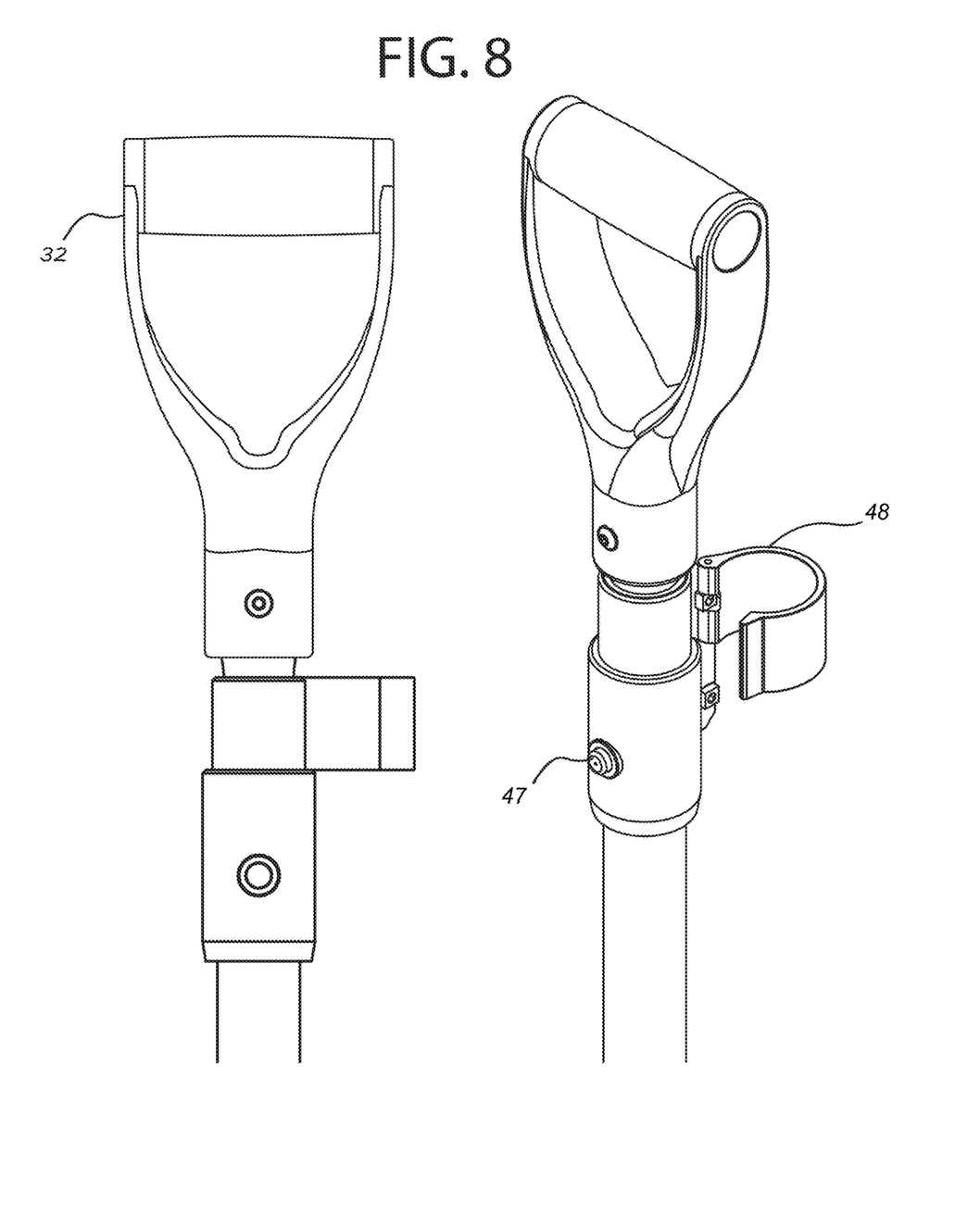
FIG. 8 shows a partial front and perspective view of an alternative embodiment of a locking mechanism and grip handle.

In general, the invention is directed to a shovel with a handle assembly that functions as an impact hammer. A key component of the handle assembly is the locking mechanism that allows the shovel to be used in different configurations. FIGS. 1-5 illustrate a first embodiment of a locking mechanism 1, which holds the slide hammer portion down 8 or extended 9. In this embodiment. a spring-biased bayonet-style locking mechanism includes an inverted L-shaped slot 31 that interacts with a projection or pin 30. This embodiment of the locking mechanism is similar to air fittings used on pneumatic air hoses, utilizing a spring activated release (spring 2), and engagement of ball bearings 3 between the inner wall of collar 4 and the outer wall of lower connector 5. This locking mechanism may be polymer based, but preferably metal. In this design, channels 6 are provided so that the ball bearings 3 are received in a deeper pocket. Absorbing material, e.g., elastomers or similar resilient material, may be added to the cylindrical walls to allow the ball bearings 3 to stay in position during shock and vibration from hammering. A standard air fitting configuration would fail if applied in this application due to the forces that must be borne by the connectors. To disengage, with the shovel in vertical position and looking down, the user pulls the outer collar 4 down 10 to slightly compress spring 2, then rotates clockwise 11 so the locking pin 30 slides into the lower leg of slot 31, allowing the spring to resile. This allows the hammer action and will prevent locking. To engage the lock, the user pulls the collar 4 down 10 to compress the spring and rotates counter-clockwise 12 to the start position, then moves the slide hammer to the short 8 or extended 9 lengths where the ball bearings click, and rest, into the indented channels on the inner tube. Referring briefly to FIG. 8, alternative implementations of a locking mechanism may include one or a combination of a spring release pin 47, friction clamp, or a vise clamp 48. Other locking mechanisms will be apparent to those of skill in the art.

The pockets, or channels 6, 7, are perpendicular to the slide hammer, may be cold rolled for enhanced strength, although they may also be milled, cut or molded. The channels can be located in multiple points along the inner surface of tube 18 and can have nesting pockets to act as guides for retaining the ball bearings 3 to prevent a twisting action during shoveling. In the illustrated example, there are only two channels 6,7, each located near the opposite ends of the inner tube that also allows the bearings free movement and allows the tubes to freely rotate. This reduces friction and prevents load on a user's hands. The body of the hammer 13 may be wood, or polymer based, but in a preferred embodiment, it is a thick metal tube with a solid billet metal hammer head 14 on the lower end. The metal hammer head 14 can be cut, cold stamped, molded, machine milled or other known method for forming metals, and may be welded or fastened via appropriate fasteners to the slide hammer end. To supplement the force of the slide hammer, an external bungee type cord can be used to help slam the hammer down, although, work is needed to stretch the bungee cord while the hammer is being lifted up. An internal spring can be employed at the hammer impact, but this could reduce the effective force of the hammer. In the illustrated example, the slide hammer does not use any additional assist such as a bungee cord or spring.

In some embodiments, the upper end of the hammer body 13 has a grip handle 15 which can be wood, rubber, polymer, metal or any combination of these materials. The preferred embodiment is a rubber and polymer combination with a straight silhouette, convex mid-section, and outwardly flared top 16 and lower end 17, to serve as a cushion and/or prevent a user's hand from slipping during impact or use. The shape of the grip handle, when standing vertically, may also be a "D" shape 32, a "Y" shape, a "T" shape, an "O" shape, a "U" shape, or an "L" shape. In the illustrated example, the grip is straight or "I" shape 15.

The lower body 18, or receiving end, of the shovel with slide hammer may include the locking mechanism, the insertion tube 19 with impact end 20, and the shovel blade 21 with attached foothold 22. The receiving main body is the outer tube in relation to the slide hammer, although it can be reversed in configuration and be the internal sliding tube and the slide hammer can be the outer tube. This approach may be less desirable in that it may be difficult to hold, or stabilize, an outer hammering tube as it will be in motion.

The receiving body 19 allows the slide hammer to slide in a straight path and can be made of wood, polymer, or a thick metal tube. As the slide hammer, or inner tube, extends out of the receiving tube the likelihood of misalignment, and angular deviation increases. This can greatly affect the path of the slide hammer and can also cause it to lock up. To remedy this a sliding bearing member 23, consisting of a thinner walled metal, or polymer cylindrical tube freely moves between the receiving tube and slide hammer when it is in action. The sliding bearing member serves three important functions. First, it prevents the slide hammer from exiting the receiving tube and coming out. Second, it prevents jamming and locking up when the slide hammer is in action. And third, it helps maintain the slide hammer in a straight path as it extends out by decreasing the chance for deviation. As will be apparent to those in the art, multiple types of bearing members can be used to maintain alignment.

In some embodiments, the impact end 20 of hammer body consists of a solid billet, metal slug that can be cut, cold stamped, molded, machine milled and welded to the receiving body and the back end of the shovel blade. Accordingly, the weight of the slide hammer is higher as it is needed to transfer an increased amount of force when hammering, although, it is not too heavy to the point of making it impractical to use. Weight can be distributed to different parts of the shovel to assist in moving soil, but in this present invention it is focused on the slide hammer.

The shovel blade 21 may be polymer, metal or a combination of these materials. The silhouette can be square, round, "V", "D", or spade shaped and include serrated edges, notches, or cut-outs, and can be altogether cut, die-cut, stamped, machined, or molded. In the illustrated example, the blade is a slightly tapering spade shape with a wide "V" pointed end. The body of the blade can be flat, scooped, undulating, folded, or creased by way of stamping, pressing, or molding. In the illustrated example, the body of the blade is a slightly pressed scoop. Furthermore, the blade, in relation to the end of the main receiving body, can be angled or pivoted at various points. Although, it is common for shovel blades to be angled for better ergonomics and transferring material, however at times it can act like a spring and deflect the force delivered by slide hammer. The position of the shovel blade in relation to the receiving main body is parallel and straight as to efficiently transfer the impact of the slide hammer from the impact end to the tip of the shovel blade end 24 and targeted point.

Figure 1:
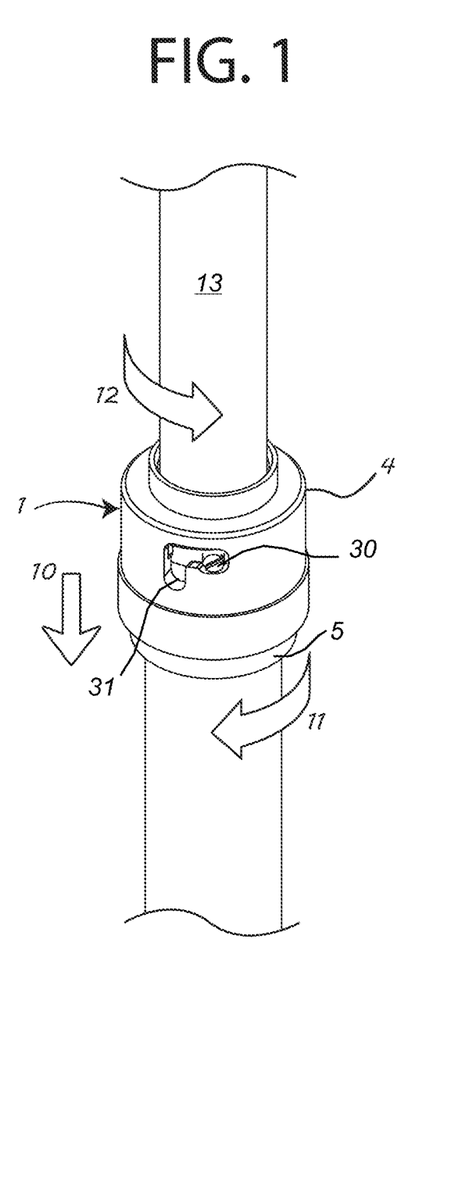
FIG. 1 is a perspective detail view of an embodiment of a locking mechanism according to an embodiment of the invention.
Figure 2:
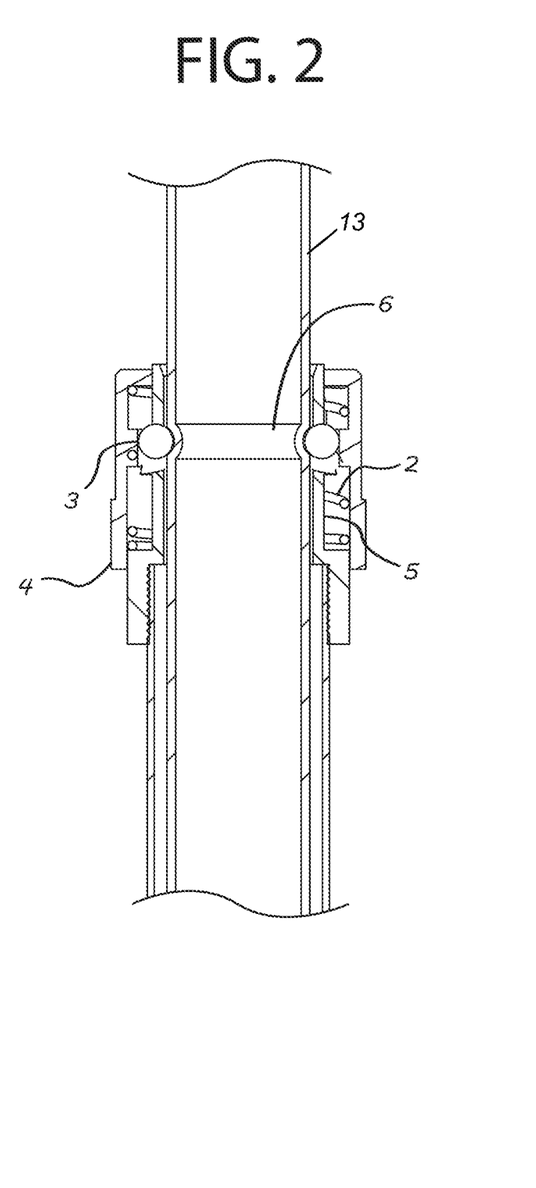
FIG. 2 shows a lateral cross sectional view of the locking mechanism of FIG. 1.
Figure 3:
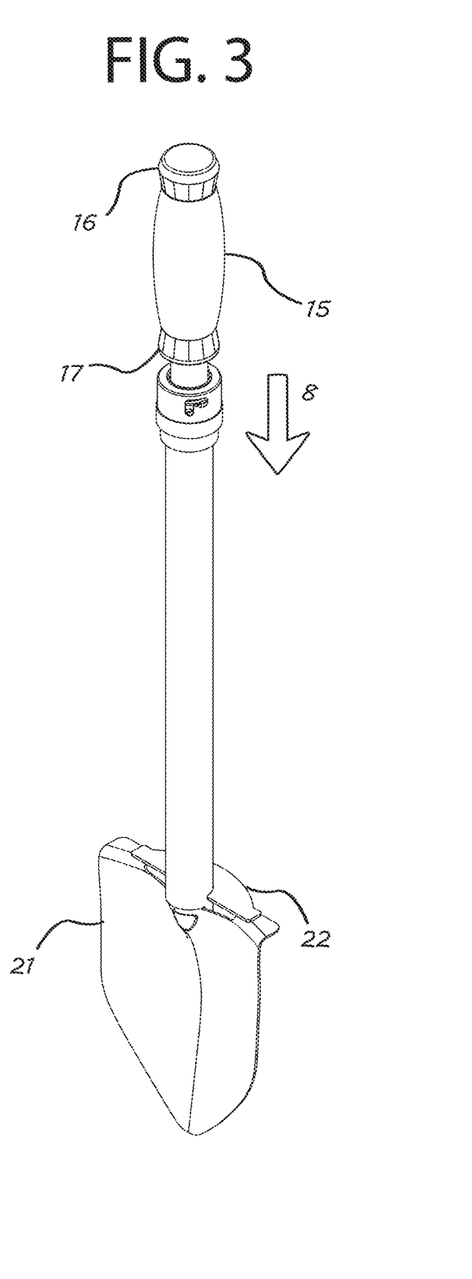
FIG. 3 shows a perspective view of the embodiment of FIG. 1 in the closed or short position.
Figure 4:
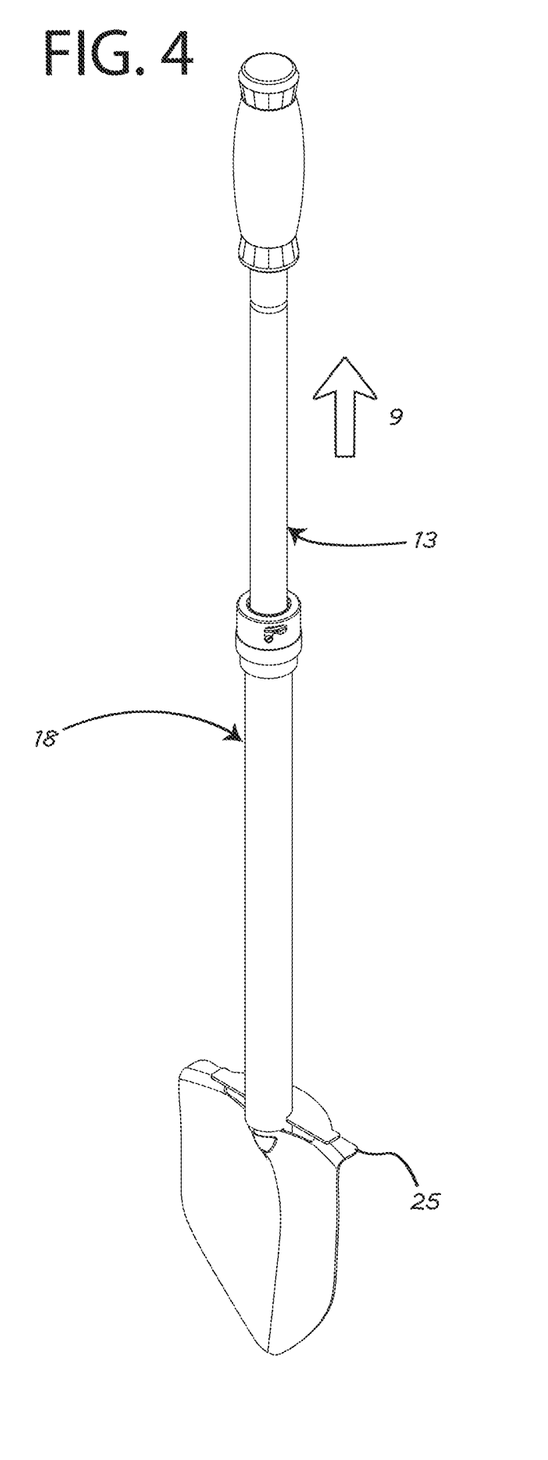
FIG. 4 shows a perspective view of the embodiment of FIG. 1 in the long or extended position.
Figure 5:
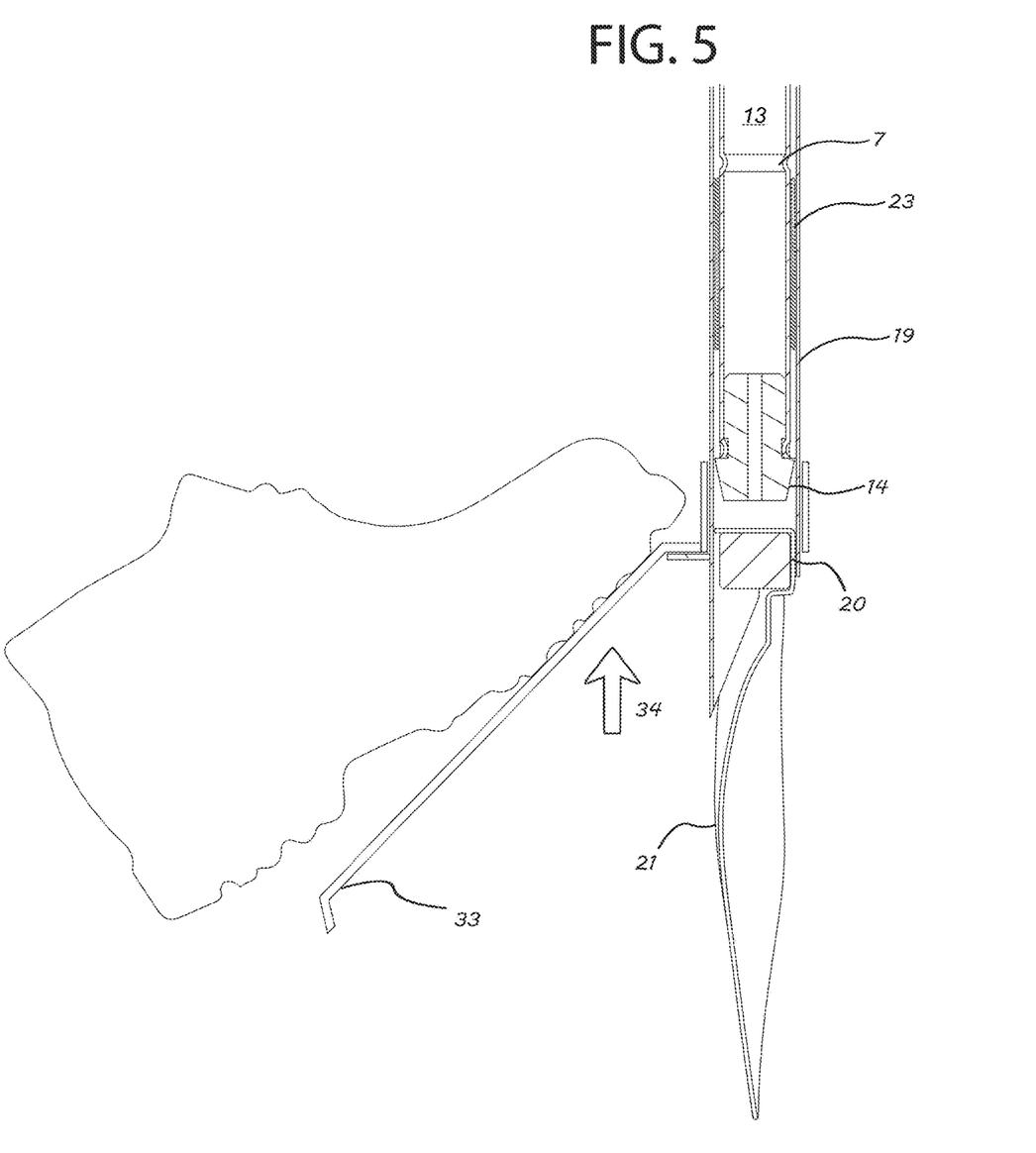
FIG. 5 shows the detail lateral cross sectional view of the lower portion of the slide hammer, and lower portion of the receiving body with shovel blade.
Figures 6, 7:
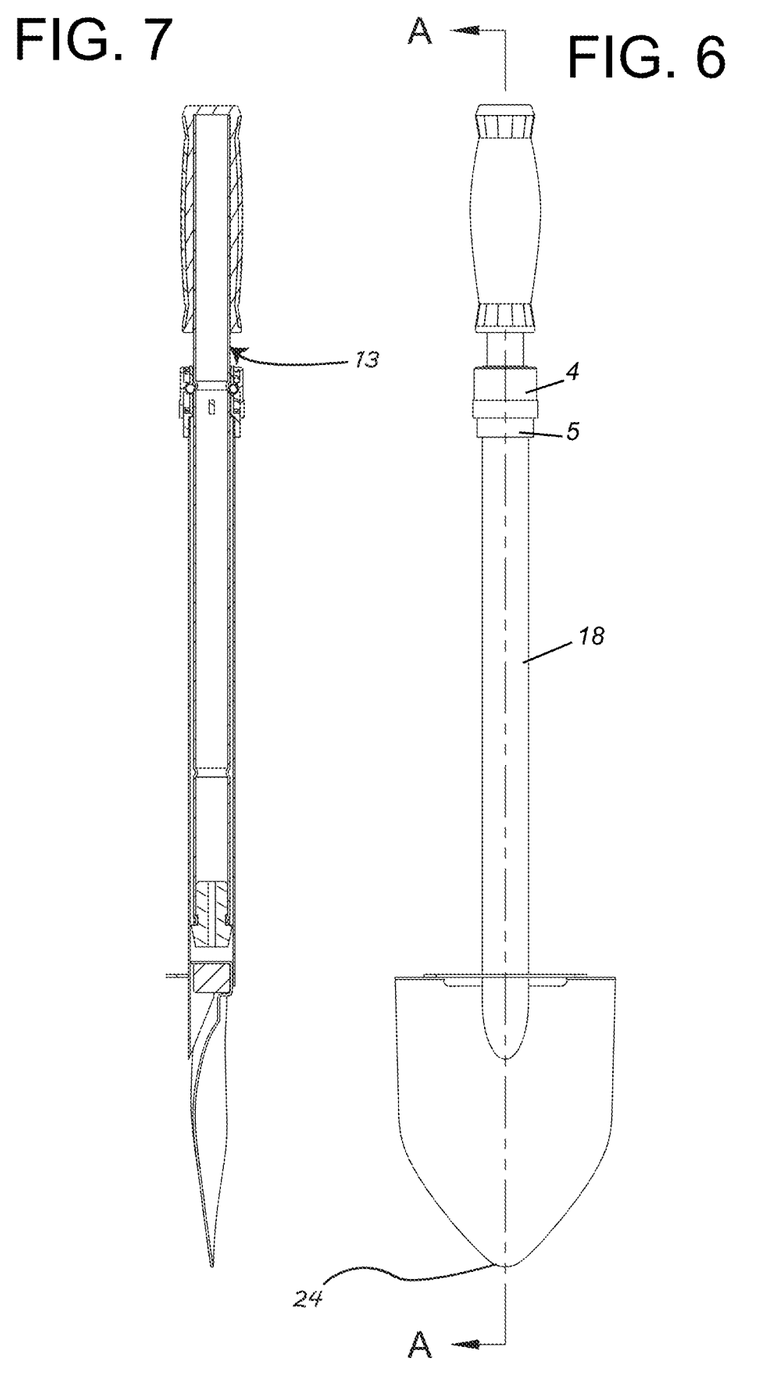
FIG. 6 shows a front view of the assembly of an embodiment.
FIG. 7 is a lateral cross-section of the embodiment taken along line A-A of FIG. 6

As shown in FIGS. 3 and 4, a foothold 22 can be cut, die-cut, stamped, machined, molded, or folded on the upper end of the shovel blade 21, and may include added pieces rubber, polymer, or metal to reinforce and/or cushion the foothold. The foothold may also include optional folded notches 25 on the back end of the blade, for example, with a die-cut metal piece centered and welded to the back of the blade end and main body tube 18. As shown in FIG. 5, an optional detachable and movable, angled foothold 33 with a longer and wider plate for a foot to press on can clip above the foothold. Foothold 33 can angle away from the blade by a variable amount, e.g., twenty to seventy degrees, and sit two to four inches above the ground toward the user's heel. The user can use this longer foothold as leverage and supplement the force pushing into the soil by pressing the toe on the upper plate and stabilizing the heel near the ground. When not in use, the longer foothold may be removed, positioned higher 34 on the outer receiving tube, or rotated out of the way.

Figure 9:
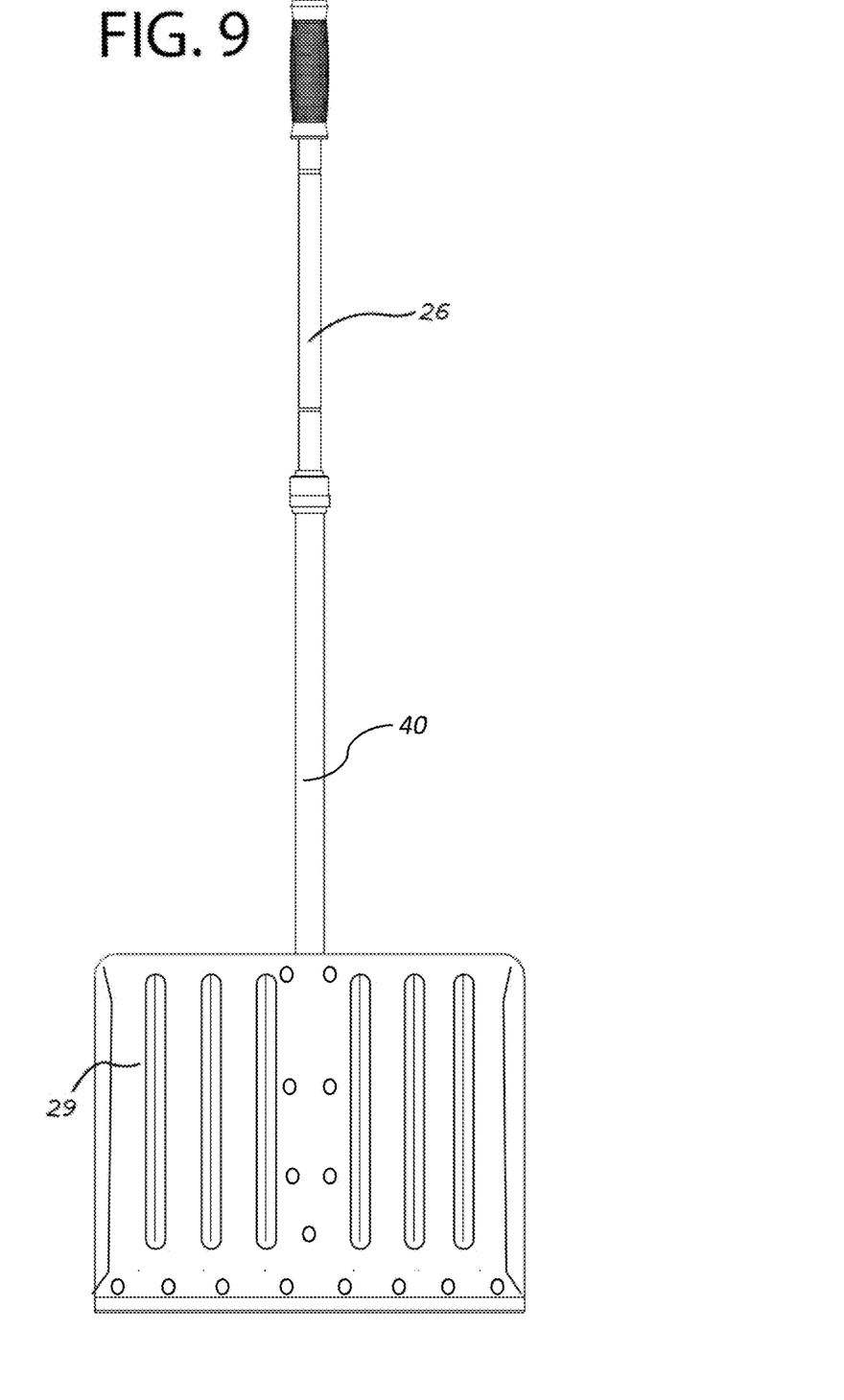
FIG. 9 is a front view of a snow shovel embodiment.
Figure 10:
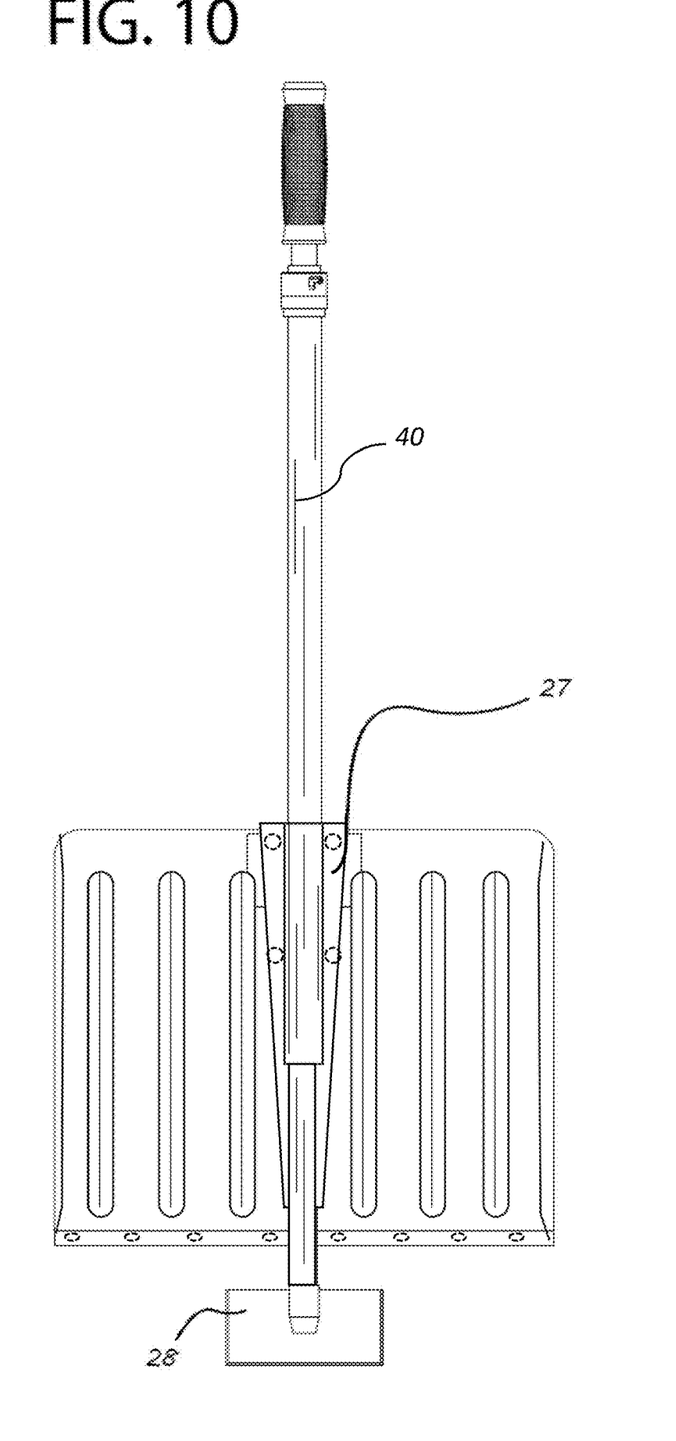
FIG. 10 is a back view of the embodiment of FIG. 9.

FIGS. 9 and 10 illustrate a snow shovel embodiment that may be used in wintertime to break hard snow and ice. In this embodiment, the impact snow shovel includes an extended slide hammer 26 that extends through both lower tube 40 and main insertion body 27, which is affixed to the distal end of lower tube 40. Insertion body 27 is attached to the bottom side of the snow shovel blade. Unlike the above-described embodiments, the impact end 28 of the slide hammer is the target point, allowing the hammer to be extended beyond the lower edge of the shovel blade to apply force to break ice or hard snow before attempting to shovel it. The hammer head 28 in this embodiment has a flat shape for breaking and scraping ice or hard snow, but can also be pointed, round, square, or a combination. The shovel blade is wider and larger for scooping snow. In FIG. 9, the snow shovel is shown with the handle fully extended for conventional use, while in FIG. 10, the handle is compressed to extend the hammer head 28 beyond the end of the shovel to apply force as needed.

The invention claimed is:

1. A shovel, comprising:
a shovel blade;
a handle assembly having a lower handle section configured to slidably and concentrically receive an upper handle section, the lower handle section comprising a hollow tube having an impact portion at a distal end, wherein the distal end is attached to the shovel blade, and wherein, when the upper handle section moves axially within the lower handle section, it functions as an impact hammer;
a hand grip disposed at a proximal end of the upper handle section; and
a locking assembly for locking the upper handle section in one of an extended position and a compressed position relative to the lower handle section, the locking assembly comprising a spring-biased collar disposed at a proximal end of the lower handle section, wherein the spring-biased collar prevents relative axial movement between the upper and lower handle sections by pressing a plurality of ball bearings into an annular channel disposed around the upper handle section, wherein releasing the locking assembly allows the upper handle section to slide within the lower handle section.

2. The shovel of claim 1, further comprising a hammer head disposed on a distal end of the upper handle section, the hammer head configured to impact upon the impact portion when the upper handle section is driven toward the lower handle section.

3. The shovel of claim 1, further comprising a sliding bearing member disposed between an outer surface of the upper handle section and an inner surface of the lower handle section, wherein the sliding bearing member is configured to slide freely within the lower handle section.

4. The shovel of claim 3, wherein the sliding bearing member comprises a thin-walled cylindrical tube configured to prevent the impact portion from exiting the upper handle portion section.

5. The shovel of claim 1, wherein the distal end of the lower handle section is rigidly attached to the shovel blade.

6. The shovel of claim 1, further comprising a foothold disposed at an upper edge of the shovel blade.

7. The shovel of claim 6, wherein the foothold extends angularly away from the shovel blade.

8. The shovel of claim 7, wherein the hammer head is configured to deliver a force to break or scrape ice.

9. A shovel, comprising:
a shovel blade;

a handle assembly comprising a tubular section and hammer section, wherein the hammer section is configured to axially slide within the tubular section to function as an impact hammer, wherein the shovel blade is disposed at a distal end of the tubular section;

a sliding bearing member disposed between an outer surface of the hammer section and an inner surface of the tubular section, wherein the sliding bearing member is configured to slide freely within the tubular section; and a locking assembly comprising a spring-biased structure for locking the hammer section in one of an extended position and a compressed position relative to the tubular section, wherein releasing the locking assembly allows the hammer section to slide within the tubular section.

10. The shovel of claim 9, further comprising a hand grip disposed at a proximal end of the hammer section.

11. The shovel of claim 9, further comprising a hammer head disposed on a distal end of the hammer section, the hammer head configured to impact upon an impact portion within a distal end of the tubular section.

12. The shovel of claim 9, wherein the sliding bearing member comprises a thin-walled cylindrical tube configured to prevent the hammer section from exiting the tubular section.

13. The shovel of claim 9, wherein the locking assembly comprises a spring-biased collar disposed at a proximal end of the tubular section, wherein the spring-biased collar prevents relative axial movement between the hammer section and the tubular section pressing a plurality of ball bearings into an annular channel disposed around a portion of the hammer section.

14. The shovel of claim 9, wherein the distal end of the tubular section is rigidly attached to the shovel blade.

15. The shovel of claim 9, further comprising an insertion body disposed on a bottom side of the shovel blade, wherein the distal end of the tubular section is affixed to the insertion body; and a hammer head disposed on a distal end of the hammer section, the hammer head configured to slidably extend through the insertion body and beyond a lower edge of the shovel blade.

16. The shovel of claim 9, further comprising a foothold disposed at an upper edge of the shovel blade.

17. The shovel of claim 16, wherein the foothold extends angularly away from the shovel blade.

* * * * *